(12) United States Patent  
Togashi et al.

(10) Patent No.: US 8,587,922 B2  
(45) Date of Patent: Nov. 19, 2013

(54) FEED-THROUGH CAPACITOR AND FEED-THROUGH CAPACITOR MOUNTING STRUCTURE

(75) Inventors: Masaaki Togashi, Tokyo (JP); Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 214 days.

(21) Appl. No.: 13/234,807

(22) Filed: Sep. 16, 2011

(65) Prior Publication Data

US 2012/0120546 A1     May 17, 2012

(30) Foreign Application Priority Data

Nov. 12, 2010   (JP) ................ 2010-253683

(51) Int. Cl.  
*H01G 4/005* (2006.01)  
*H01G 4/06* (2006.01)

(52) U.S. Cl.  
USPC .......................................... 361/303; 361/311

(58) Field of Classification Search  
USPC ...................... 361/303, 311, 306.1  
See application file for complete search history.

(56) References Cited

U.S. PATENT DOCUMENTS 6,943,646 B2 *   9/2005   Gamliel ................. 333/185

FOREIGN PATENT DOCUMENTS

| JP | A 2-251120 | 10/1990 |
| JP | A 6-151244 | 5/1994 |
| JP | A-09-055335 | 2/1997 |
| JP | A 2002-237429 | 8/2002 |
| JP | A 2009-218363 | 9/2009 |

* cited by examiner

*Primary Examiner* — Eric Thomas  
(74) *Attorney, Agent, or Firm* — Oliff & Berridge, PLC (57) ABSTRACT

In a feed-through capacitor, a conduction unit having a plurality of conduction inner electrodes can fully secure a tolerable level of DC. A capacitor unit is formed on the mount surface side in a capacitor body, so that high-frequency noise components can be removed by the capacitor unit before reaching the conduction unit. The distance between the grounding inner electrode located closest to the conduction unit and the conduction inner electrode in the conduction unit is greater than that between the signal inner electrode and grounding inner electrode in the capacitor unit. This enhances the impedance between the capacitor unit and the conduction unit, so as to inhibit the high-frequency noise components from flowing into the conduction unit.

8 Claims, 8 Drawing Sheets

FEED-THROUGH CAPACITOR AND FEED-THROUGH CAPACITOR MOUNTING STRUCTURE

BACKGROUND OF THE INVENTION

1. Field of the Invention

The present invention relates to a feed-through capacitor and a feed-through capacitor mounting structure.

2. Related Background Art

An example of conventional feed-through capacitors is one disclosed in Japanese Patent Application Laid-Open No. 9-55335. In this through-hole conductor, at least three through-hole electrodes (hereinafter referred to as "conduction units") are arranged between earth electrodes within its matrix. This reduces the total resistance value of the through-hole electrodes and secures a tolerable level of DC in the feed-through capacitor.

SUMMARY OF THE INVENTION

Though the above-mentioned conventional feed-through capacitor can secure the tolerable level of DC, high-frequency noise components may flow toward the conduction units, whereby noise removing effects may not fully be obtained.

For overcoming the problem mentioned above, it is an object of the present invention to provide a feed-through capacitor which can secure a tolerable level of DC and can inhibit high-frequency noise components from flowing into conduction units, and a mounting structure for such a feed-through capacitor.

For solving the above-mentioned problem, the feed-through capacitor in accordance with the present invention comprises a capacitor body, formed by stacking dielectric layers provided with inner electrodes, having a mount surface for a mounting substrate; signal terminal electrodes respectively arranged at end faces of the capacitor body opposing each other in a first direction; grounding terminal electrodes respectively arranged at side faces of the capacitor opposing each other in a second direction different from the first direction; a capacitor unit formed on the mount surface side within the capacitor body; and a conduction unit formed adjacent to the capacitor unit; the capacitor unit has a signal inner electrode connected to the signal terminal electrodes and a grounding inner electrode connected to the grounding terminal electrodes while opposing the signal inner electrode through the dielectric layer; the conduction unit has a conduction inner electrode for connecting the signal terminal electrodes to each other; and the distance between the inner electrode of the capacitor unit located closest to the conduction unit and the conduction inner electrode of the conduction unit is greater than that between the inner electrodes in the capacitor unit.

In this feed-through capacitor, the conduction unit having the conduction inner electrode for connecting the signal terminal electrodes to each other can secure a tolerable level of DC. Since the capacitor unit is formed on the mount surface side of the capacitor body, high-frequency noise components can be removed by the capacitor unit before reaching the conduction unit. In this feed-through capacitor, the distance between the inner electrode of the capacitor unit located closest to the conduction unit and the conduction inner electrode of the conduction unit is greater than that between the inner electrodes in the capacitor unit. This enhances the impedance between the capacitor unit and the conduction unit, thereby making it possible to feed the high-frequency noise components from the signal inner electrode of the capacitor unit to its grounding inner electrode, so as to make them flow reliably to the grounding terminal electrodes.

Preferably, in the conduction unit, a plurality of conduction inner electrodes are arranged such as to oppose each other through the dielectric layer. This lowers the resistance value of the conduction unit, whereby the tolerable level of DC can be secured more favorably.

Preferably, the distance between the conduction inner electrodes in the conduction unit is smaller than that between the inner electrodes in the capacitor unit. This can increase the number of layers of conduction inner electrodes in the conduction unit, whereby the tolerable level of DC can be secured more favorably.

Preferably, in the capacitor unit, the inner electrode located closest to the conduction unit is the grounding inner electrode. In this case, a capacity is formed between the conduction inner electrode of the conduction unit and the grounding inner electrode of the capacitor unit, whereby the capacitance of the feed-through capacitor can be improved.

Preferably, in the capacitor unit, the inner electrode located closest to the conduction unit is the signal inner electrode. This keeps the distance between the grounding inner electrode of the capacitor unit and the conduction inner electrode of the conduction unit, so that the high-frequency noise components in the capacitor unit are removed more reliably.

Preferably, on a side opposite from the capacitor unit across the conduction unit in the capacitor body, another capacitor unit is formed. This eliminates the directivity of the feed-through capacitor at the time of mounting and thus can improve the workability during mounting.

Preferably, the conduction inner electrodes are connected to each other through a pinhole. This further reduces the resistance value of the conduction unit and can secure the tolerable level of DC more favorably in the feed-through capacitor.

Preferably, the signal inner electrode is separated into a first part connected to one signal terminal electrode and a second part connected to the other signal terminal electrode. This can prevent the DC from flowing into the signal inner electrode and heating the same.

The feed-through capacitor mounting structure in accordance with the present invention is one formed by joining the above-mentioned feed-through capacitor to an electrode of a mounting substrate, wherein, in a stacking direction of the capacitor body, the distance from the electrode of the mounting substrate to the conduction inner electrode of the conduction unit is longer than the distance from the electrode of the mounting substrate to the inner electrode of the capacitor unit located closest to the conduction unit.

In this feed-through capacitor mounting structure, the distance from the mounting substrate to the conduction unit is longer than the distance from the mounting substrate to the capacitor unit. This enhances the impedance between the capacitor unit and the conduction unit, thereby making it possible to feed the high-frequency noise components from the signal inner electrodes of the capacitor unit to the grounding inner electrodes, so as to make them flow reliably to the grounding terminal electrodes.

Preferably, $W/(b-a)<35$, where W is the width of the capacitor body, a is the distance from the electrode of the mounting substrate to the signal inner electrode of the capacitor unit located closest to the conduction unit, and b is the distance from the electrode of the mounting substrate to the conduction inner electrode of the conduction unit located closest to the capacitor unit. Satisfying such a condition makes it possible for the high-frequency noise components to flow more reliably to the grounding terminal electrodes.

The present invention can secure the tolerable level of DC and inhibit the high-frequency noise components from flowing into the conduction unit.

DESCRIPTION OF THE PREFERRED EMBODIMENTS

In the following, preferred embodiments of the feed-through capacitor in accordance with the present invention will be explained in detail with reference to the drawings.

First Embodiment

Figure 1:
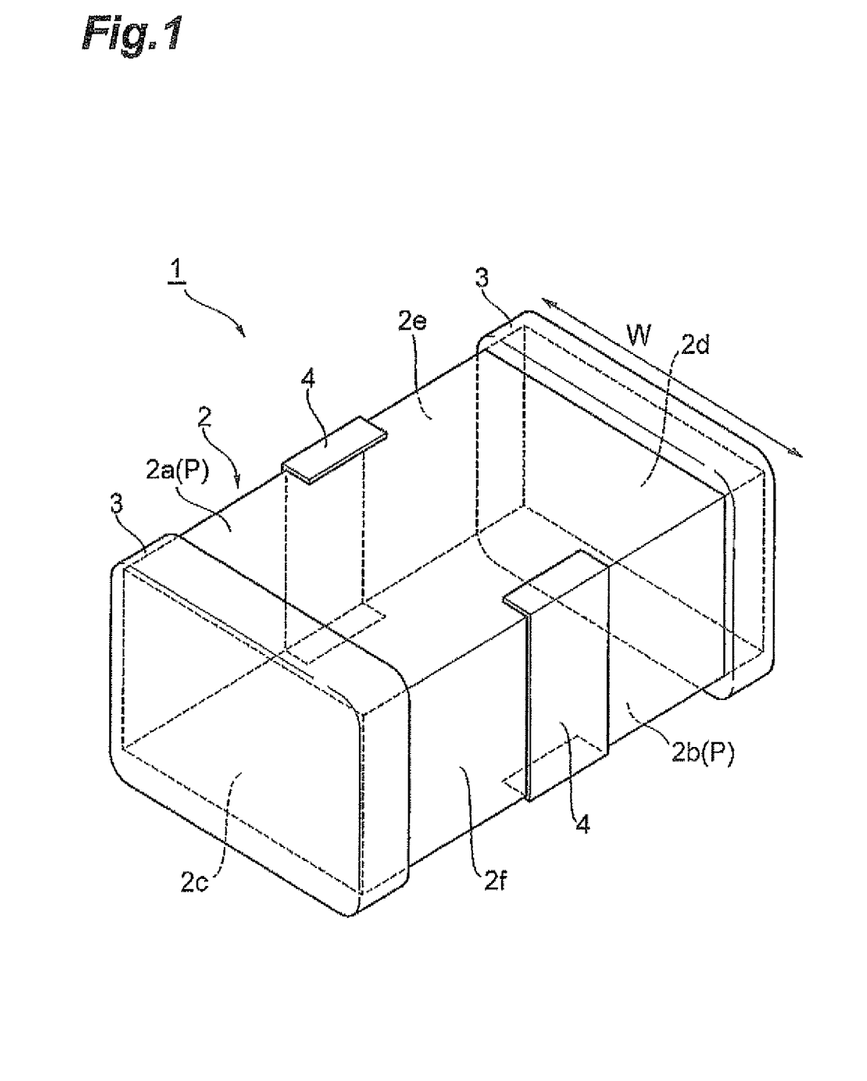
FIG. 1 is a perspective view of the feed-through capacitor in accordance with a first embodiment of the present invention.
Figure 2:
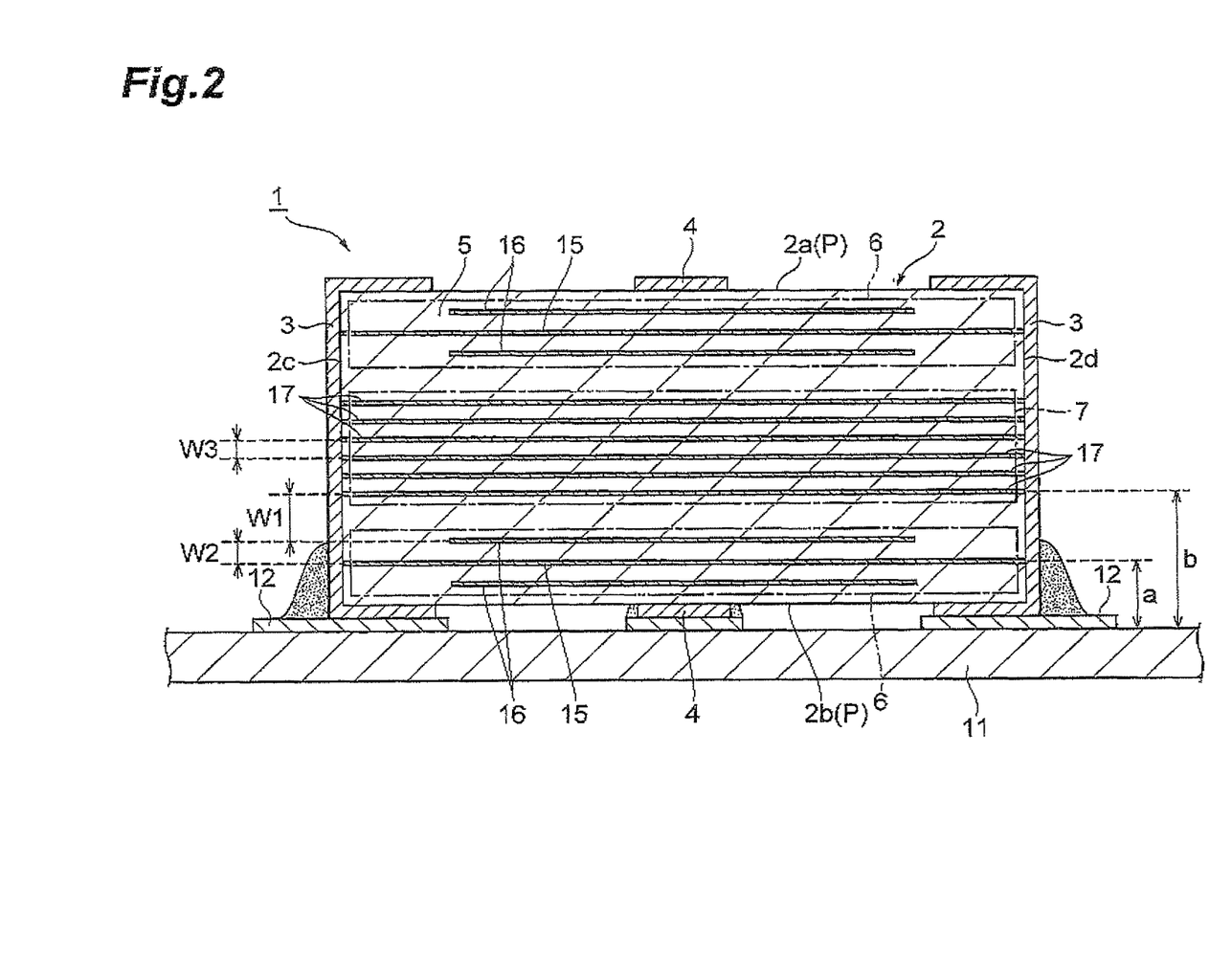
FIG. 2 is a sectional view illustrating a mounted state of the feed-through capacitor illustrated in FIG. 1.

FIG. 1 is a perspective view of the feed-through capacitor in accordance with the first embodiment of the present invention. FIG. 2 is a sectional view illustrating a mounted state of the feed-through capacitor illustrated in FIG. 1. As illustrated in FIGS. 1 and 2, the feed-through capacitor 1 comprises a capacitor body 2, signal terminal electrodes 3, 3, and grounding terminal electrodes 4, 4.

As illustrated in FIG. 2, the capacitor body 2 is formed by stacking a plurality of dielectric layers 5 provided with inner electrodes and has a substantially rectangular parallelepiped form. The dielectric layers 5 are formed by a dielectric material having an electrostrictive characteristic, examples of which include those based on $BaTiO_3$, $Ba(Ti, Zr)O_3$, and $(Ba, Ca)TiO_3$. The top face 2a and bottom face 2b of the capacitor body 2 serve as mount surfaces P for a mounting substrate 11. Within the capacitor body 2, capacitor units 6, 6 are formed so as to be located closer to the upper and lower mount surfaces P, respectively, while a conduction unit 7 is formed on the center side as being held between the capacitor units 6, 6.

The signal terminal electrodes 3 are formed so as to cover longitudinal end faces 2c, 2d of the capacitor body 2, respectively, and oppose each other. Each signal terminal electrode 3 is multilayered, in which the inner layer in contact with the capacitor body 2 uses Cu, Ni, or Ag—Pd, for example, while outer layers are plated with Ni or Sn, for example.

The grounding terminal electrodes 4 are formed at substantially the center portions of side faces 2e, 2f orthogonal to the end faces 2c, 2e in the capacitor body 2, respectively, and oppose each other. Each grounding terminal electrode 4 is multilayered by materials similar to those of the signal terminal electrode 3. The grounding terminal electrodes 4 are electrically insulated from the signal terminal electrodes 3 on the surface of the capacitor body 2.

The capacitor units 6 and conduction unit 7 formed in the capacitor body 2 will now be explained.

Each capacitor unit 6 has a signal inner electrode 15 connected to the signal terminal electrodes 3 and grounding inner electrodes 16 connected to the respective grounding terminal electrodes 4 and is formed by alternately arranging the signal inner electrode 15 and grounding inner electrodes 16 while alternating them with the dielectric layers 5.

Figure 3:
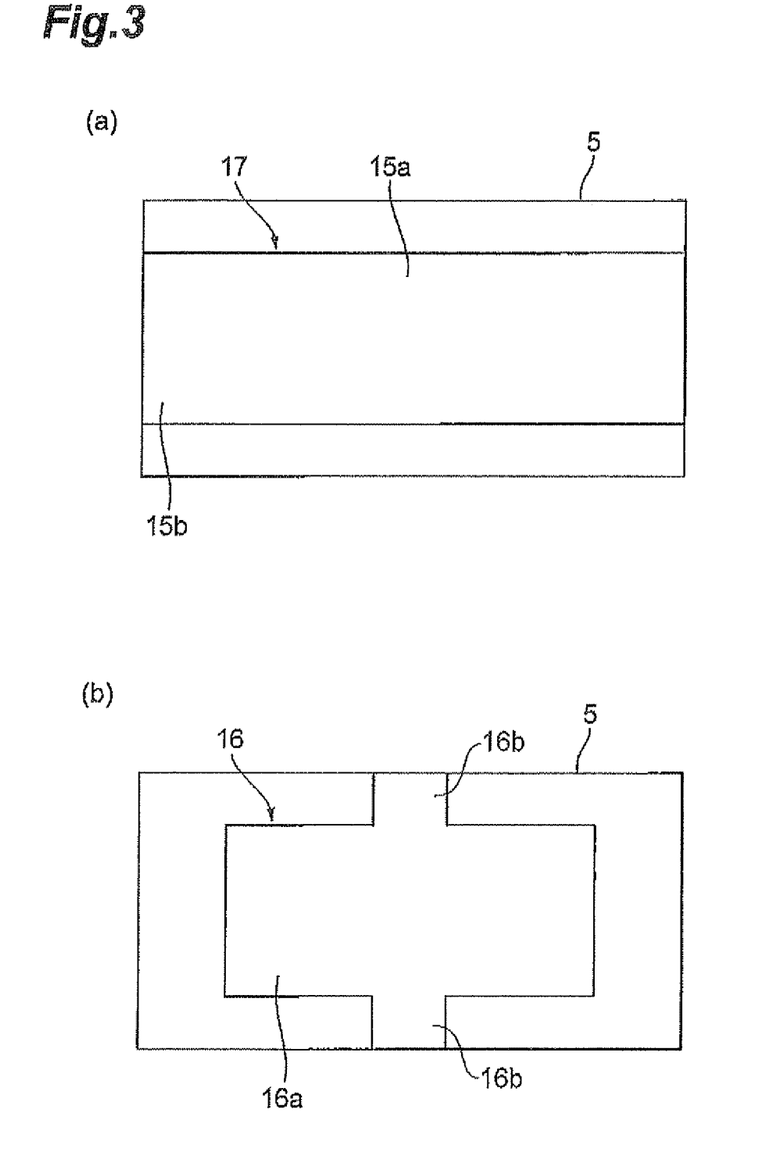
FIG. 3 is a view illustrating patterns of inner electrodes constituting a capacitor unit.

As illustrated in FIG. 3(a), the signal inner electrode 15 is formed into a substantially rectangular pattern when seen in the stacking direction of the dielectric layers 5 and has an opposing part 15a opposing the grounding inner electrode 16 and lead parts 15b, 15b drawn from both ends of the opposing part 15a to the signal terminal electrodes 3, 3, respectively. As a consequence, the signal inner electrode 15 electrically connects the signal terminal electrodes 3, 3 formed on the end faces 2c, 2d to each other.

As illustrated in FIG. 3(b), each grounding inner electrode 16 is formed into a substantially rectangular pattern when seen in the stacking direction of the dielectric layers 5 and has an opposing part 16a opposing the signal inner electrode 15 and lead parts 16b, 16b drawn from substantially the center of the opposing part 16a to the grounding terminal electrodes 4, 4. As a consequence, the grounding inner electrode 16 electrically connects the grounding terminal electrodes 4, 4 formed on the side faces 2e, 2f to each other.

Figure 4:
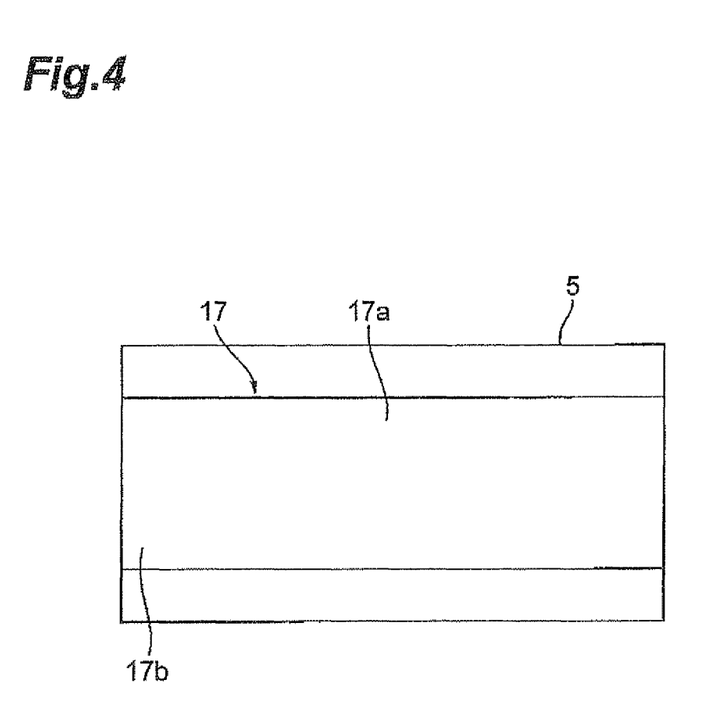
FIG. 4 is a view illustrating a pattern of an inner electrode constituting a conduction unit.

On the other hand, the conduction unit 7 is formed by alternating a plurality of conduction inner electrodes 17 with the dielectric layers 5, while each conduction inner electrode 17 connects the signal terminal electrodes 3, 3 to each other. As illustrated in FIG. 4, each conduction inner electrode 17 is formed into a substantially rectangular pattern when seen in the stacking direction of the dielectric layers 5 and has an opposing part 17a opposing its adjacent conduction inner electrodes 17 and lead parts 17b, 17b drawn from substantially the center of the opposing part 17a to the signal terminal electrodes 3, 3. As a consequence, the conduction inner electrode 17 electrically connects the signal terminal electrodes 3, 3 formed on the end faces 2c, 2d to each other.

In this embodiment, in the capacitor unit 6, the inner electrode located closest to the conduction unit 7 is the grounding inner electrode 16, which opposes the conduction inner electrode 17, whereby a fixed capacity is also formed between the capacitor unit 6 and the conduction unit 7.

In the capacitor units 6 and conduction unit 7 mentioned above, letting W1 be the distance between the grounding inner electrode 16 located closest to the conduction unit 7 and the conduction inner electrode 17, and W2 the distance between the signal inner electrode 15 and the grounding inner electrode 16, W1>W2, so that the thickness of the dielectric layer 5 interposed between the capacitor unit 6 and the conduction unit 7 is greater than that of the dielectric layer 5 between each pair of the inner electrodes in the capacitor unit 6.

Letting W3 be the distance between the conduction inner electrodes 17, 17 in the conduction unit 7, W2>W3, whereby the dielectric layer 5 interposed between the conduction inner electrodes 17, 17 has a thickness smaller than that of the dielectric layer 5 interposed between the inner electrodes of the capacitor unit 6.

Such adjustment among layers may be achieved by changing the number of stacked green sheets having no inner electrode patterns interposed between those formed with inner electrode patterns when constructing the capacitor body 2, for example.

In the state where the feed-through capacitor 1 is mounted on the mounting substrate 11 as illustrated in FIG. 2, letting a be the distance from the electrode of the mounting substrate 11 to the signal inner electrode 15 of the capacitor unit 6 located closest to the conduction unit 7, and b the distance from the electrode 12 of the mounting substrate 11 to the conduction inner electrode 17 of the conduction unit 7 located closest to the capacitor unit 6 in the stacking direction of the capacitor body 2, b>a. Letting W be the width, of the capacitor body 2 (see FIG. 1), W/(b−a)<35.

In thus constructed feed-through capacitor 1, the conduction unit 7 having a plurality of conduction inner electrodes 17 connecting the signal terminal electrodes 3, 3 to each other can fully secure a tolerable level of DC. Since the capacitor unit 6 and conduction unit 7 are formed on the mount surface P side and center side of the capacitor body 2, respectively, high-frequency noise components can be removed by the capacitor unit 6 before reaching the conduction unit 7.

Figure 5:
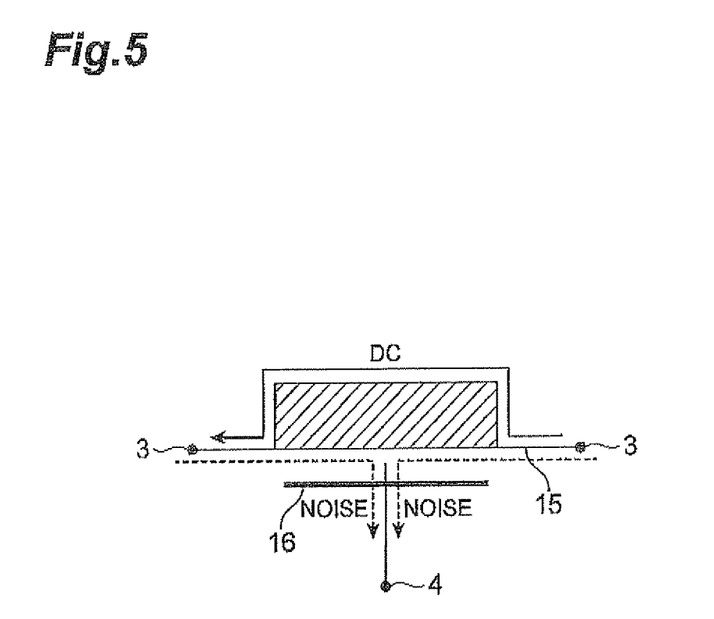
FIG. 5 is a view illustrating an operation and effect of the feed-through capacitor illustrated in FIG. 1.

In the feed-through capacitor 1, the distance W2 between the grounding inner electrode 16 of the capacitor unit 6 located closest to the conduction unit 7 and the conduction inner electrode 17 of the conduction unit 7 is greater than the distance W2 between the signal inner electrode 15 and grounding inner electrode 16 in the capacitor unit 6. This enhances the impedance between the capacitor unit 6 and the conduction unit 7, so as to inhibit the high-frequency noise components from flowing into the conduction unit 7 as illustrated in FIG. 5, thereby making it possible to feed the high-frequency noise components from the signal inner electrodes 15 of the capacitor units 6 to their grounding inner electrodes 16, so as to make them flow reliably to the grounding terminal electrodes 4.

In the capacitor body 2 of the feed-through capacitor 1, the capacitor units 6, 6 are formed on the upper and lower sides of the conduction unit 7 so as to hold it therebetween. This eliminates the directivity of the feed-through capacitor 1 at the time of mounting the feed-through capacitor 1 to the mounting substrate 11 and thus can improve the workability during mounting.

Second Embodiment

Figure 6:
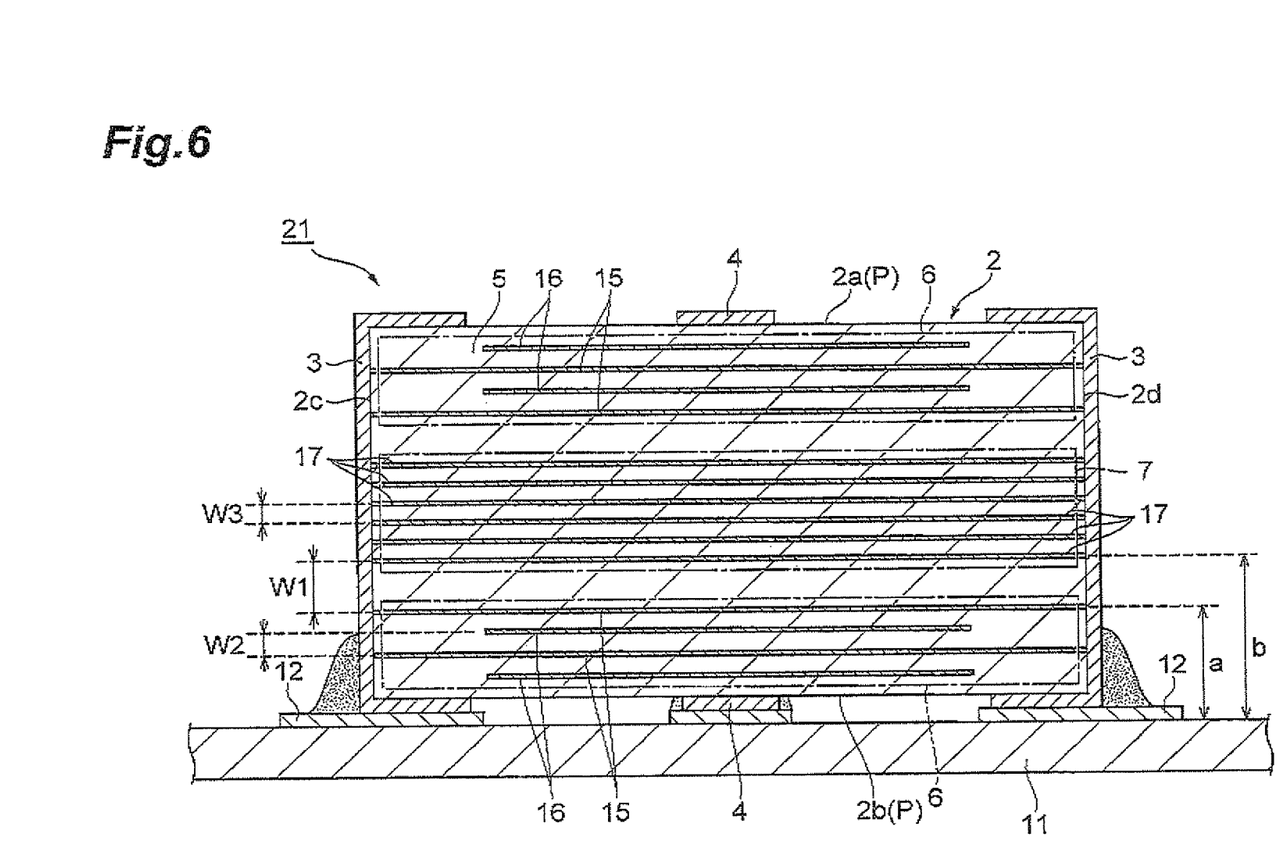
FIG. 6 is a sectional view illustrating the feed-through capacitor in accordance with a second embodiment of the present invention in a mounted state.

FIG. 6 is a sectional view illustrating the feed-through capacitor in accordance with the second embodiment in a mounted state. As illustrated in this drawing, the feed-through capacitor 21 in accordance with the second embodiment differs from the first embodiment in the arrangement of inner electrodes in the capacitor units 6. That is, in the feed-through capacitor 21, signal inner electrodes 15 alternate with grounding inner electrodes 16 in each capacitor unit 6 such that the inner electrode located closest to the conduction unit 7 is the signal inner electrode 15.

Letting W1 be the distance between the signal inner electrode 15 located closest to the conduction unit 7 and the conduction inner electrode 17, and W2 the distance between the signal inner electrode 15 and the grounding inner electrode 16, W1>W2, whereby the dielectric layer 5 interposed between the capacitor unit 6 and the conduction unit 7 has a thickness greater than that of the dielectric layer 5 interposed between the inner electrodes in the capacitor unit 6.

Letting W3 be the distance between the conduction inner electrodes 17, 17 in the conduction unit 7, W2>W3, whereby the dielectric layer 5 interposed between the conduction inner electrodes 17, 17 has a thickness smaller than the dielectric layer 5 interposed between the inner electrodes in the capacitor unit 6.

Thus constructed feed-through capacitor 21 inhibits the high-frequency noise components from flowing into the conduction unit 7 as in the first embodiment, thereby making it possible to feed the high-frequency noise components from the signal inner electrodes 15 of the capacitor units 6 to their grounding inner electrodes 16, so as to make them flow reliably to the grounding terminal electrodes 4. Since the inner electrode located closest to the conduction unit 7 is the signal inner electrode 15, the distance between the grounding inner electrode 15 of the capacitor unit 6 and the conduction inner electrode 17 of the conduction unit 7 is kept, so that the high-frequency noise components can be removed more reliably in the capacitor unit 6.

Third Embodiment

Figure 7:
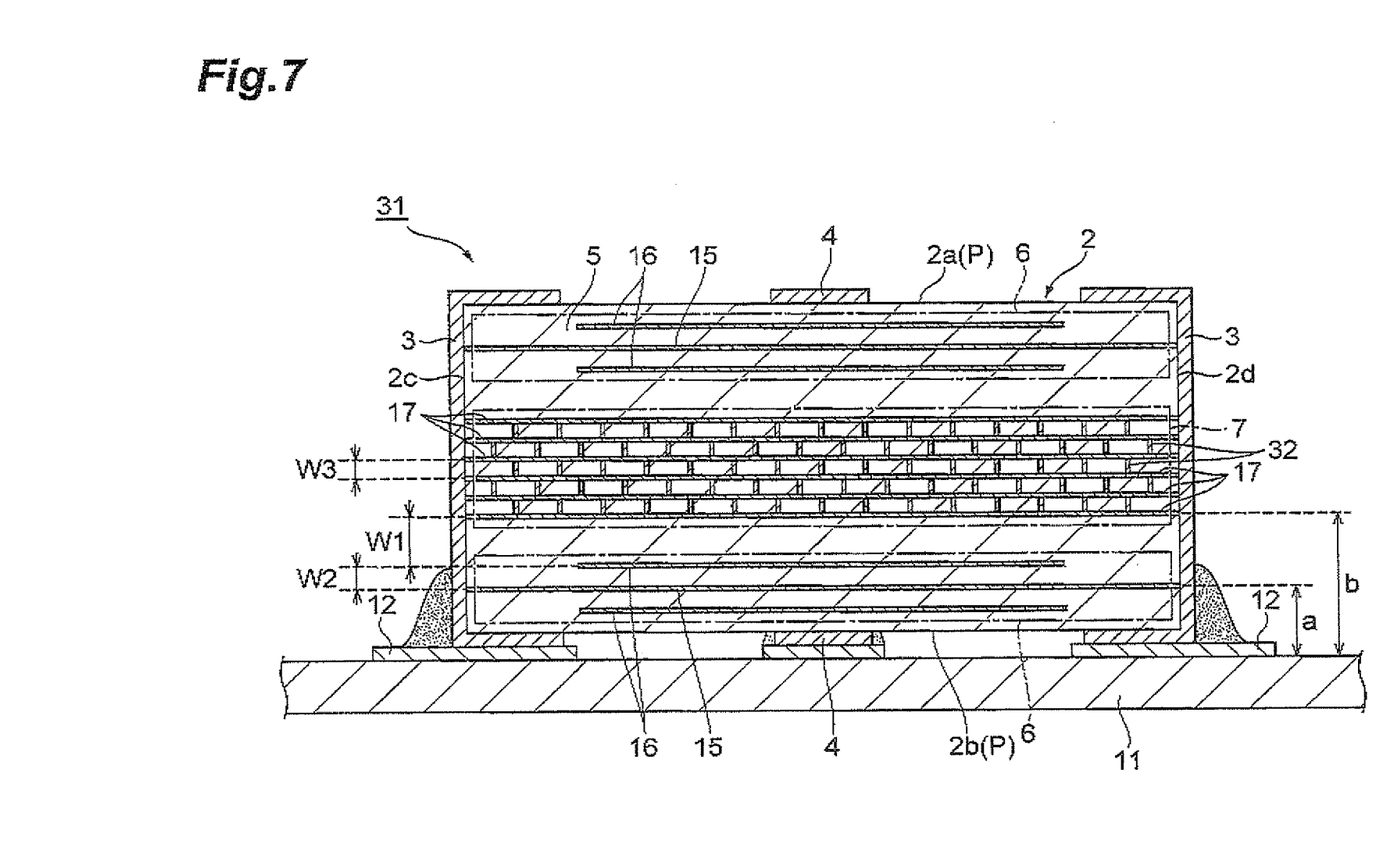
FIG. 7 is a sectional view illustrating the feed-through capacitor in accordance with a third embodiment of the present invention in a mounted state.

FIG. 7 is a sectional view illustrating the feed-through capacitor in accordance with the third embodiment in a mounted state. As illustrated in this drawing, the feed-through capacitor 31 in accordance with the third embodiment differs from the first embodiment in the arrangement of inner electrodes in the conduction unit 7. That is, in the feed-through capacitor 31, the conduction inner electrodes 17, 17 in the conduction unit 7 are connected to each other through a plurality of pinholes 32.

Thus constructed feed-through capacitor 31 inhibits the high-frequency noise components from flowing into the conduction unit 7 as in the first embodiment, thereby making it possible to feed the high-frequency noise components from the signal inner electrodes 15 of the capacitor units 6 to their grounding inner electrodes 16, so as to make them flow reliably to the grounding terminal electrodes 4. Since the conduction inner electrodes 17, 17 are connected to each other through the pinholes 32, the resistance value of the conduction unit 7 is further reduced, whereby the tolerable level of DC can be secured more favorably in the feed-through capacitor 31.

The present invention is not limited to the above-mentioned embodiments. For example, while the capacitor units 6, 6 are formed on the upper and lower sides of the conduction unit 7 so as to hold it therebetween in the above-mentioned embodiments, it is not always necessary for them to be formed on both sides; the capacitor unit 6 may be provided on one side alone.

Figure 8:
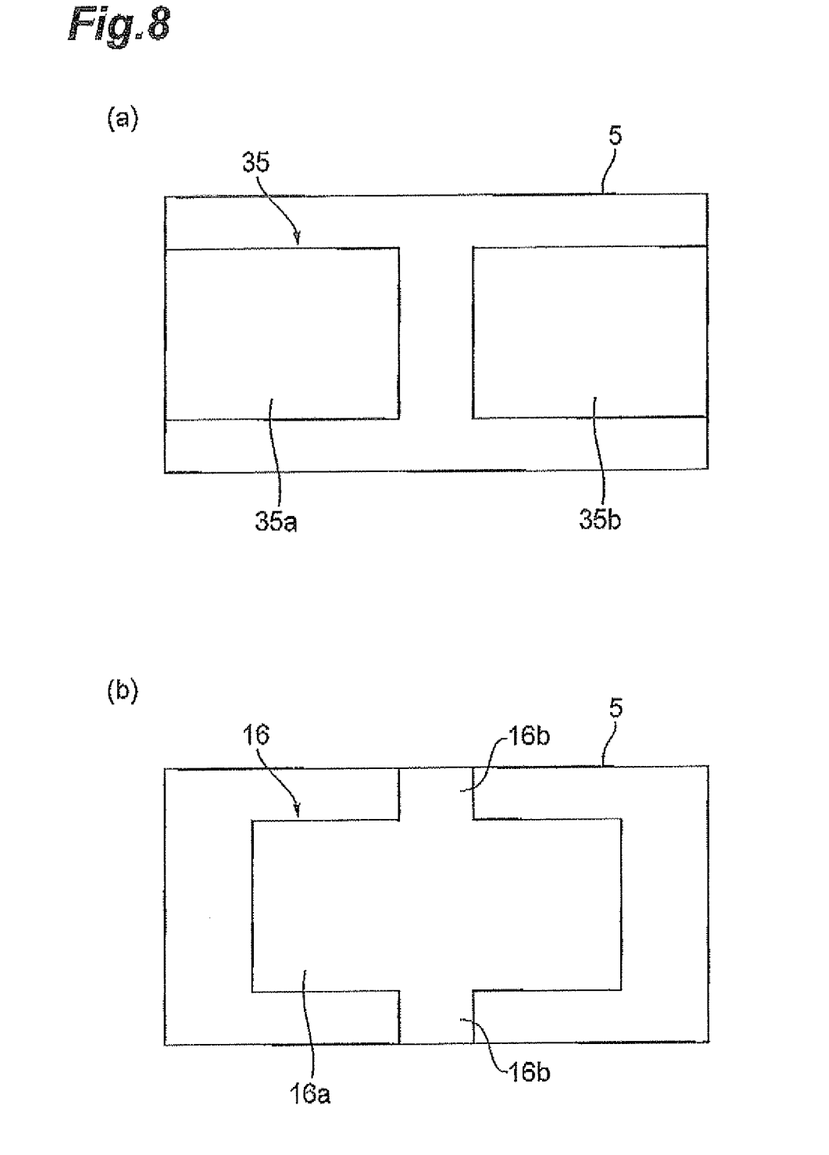
FIG. 8 is a view illustrating patterns of inner electrodes constituting a conduction unit of the feed-through capacitor in accordance with a modified example.

Though each of the signal inner electrodes 15 in the capacitor units 6 has a substantially rectangular pattern such as to electrically connect the signal terminal electrodes 3, 3 formed on the end faces 2c, 2d to each other in the above-mentioned embodiments, a signal inner electrode 35 separated into a first part 35a connected to one signal terminal electrode 3 and a second part 35b connected to the other signal terminal electrode 3 as illustrated in FIG. 8(a) may be used in place of such a signal inner electrode 15. This can prevent the DC from flowing into the signal inner electrodes 35 and heating the same. As illustrated in FIG. 8(b), the grounding inner electrodes 16 may use a pattern similar to that in FIG. 3(b).

What is claimed is:

1. A feed-through capacitor comprising:
a capacitor body, formed by stacking dielectric layers provided with inner electrodes, having a mount surface for a mounting substrate;
signal terminal electrodes respectively arranged at end faces of the capacitor body opposing each other in a first direction;
grounding terminal electrodes respectively arranged at side faces of the capacitor opposing each other in a second direction different from the first direction;

a capacitor unit formed on the mount surface side within the capacitor body; and a conduction unit formed adjacent to the capacitor unit;

wherein the capacitor unit has a signal inner electrode connected to the signal terminal electrodes and a grounding inner electrode connected to the grounding terminal electrodes while opposing the signal inner electrode through the dielectric layer;

wherein the conduction unit has a conduction inner electrode for connecting the signal terminal electrodes to each other;

wherein a distance between the inner electrode of the capacitor unit located closest to the conduction unit and the conduction inner electrode of the conduction unit is greater than a distance between the inner electrodes in the capacitor unit;

wherein a distance between the conduction inner electrodes in the conduction unit is smaller than the distance between the inner electrodes in the capacitor unit;

wherein the grounding inner electrodes are arranged interposing at least one layer of the signal inner electrode in the stacking direction, in the capacitor unit, and wherein the conduction inner electrodes are arranged such as to oppose each other through the dielectric layer.

2. A feed-through capacitor according to claim 1, wherein, in the capacitor unit, the inner electrode located closest to the conduction unit is the grounding inner electrode.

3. A feed-through capacitor according to claim 1, wherein, in the capacitor unit, the inner electrode located closest to the conduction unit is the signal inner electrode.

4. A feed-through capacitor according to claim 1, wherein, on a side opposite from the capacitor unit across the conduction unit in the capacitor body, another capacitor unit is formed.

5. A feed-through capacitor according to claim 1, wherein the conduction inner electrodes are connected to each other through a pinhole.

6. A feed-through capacitor according to claim 1, wherein the signal inner electrode is separated into a first part connected to one signal terminal electrode and a second part connected to the other signal terminal electrode.

7. A feed-through capacitor mounting structure formed by joining the feed-through capacitor according to claim 1 to an electrode of a mounting substrate;

wherein, in a stacking direction of the capacitor body, a distance from the electrode of the mounting substrate to the conduction inner electrode of the conduction unit is longer than a distance from the electrode of the mounting substrate to the inner electrode of the capacitor unit located closest to the conduction unit.

8. A feed-through capacitor mounting structure according to claim 7, wherein W/(b−a)<35, where W is a width of the capacitor body, a is a distance from the electrode of the mounting substrate to the signal inner electrode of the capacitor unit located closest to the conduction unit, and b is the distance from the electrode of the mounting substrate to the conduction inner electrode of the conduction unit located closest to the capacitor unit.

\* \* \* \* \*